(12) United States Patent
Stenneth

(10) Patent No.: US 9,720,418 B2
(45) Date of Patent: Aug. 1, 2017

(54) AUTONOMOUS VEHICLE MONITORING AND CONTROL

(71) Applicant: HERE Global B.V., Veldhoven (NL)

(72) Inventor: Leon Oliver Stenneth, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 102 days.

(21) Appl. No.: 14/287,898

(22) Filed: May 27, 2014

(65) Prior Publication Data

US 2015/0346718 A1    Dec. 3, 2015

(51) Int. Cl.
| | | |
|---|---|---|
| G05D 1/00 | (2006.01) | |
| G05D 3/00 | (2006.01) | |
| G06F 7/00 | (2006.01) | |
| G06F 17/00 | (2006.01) | |
| G01C 22/00 | (2006.01) | |
| G05D 1/02 | (2006.01) | |
| G06Q 30/06 | (2012.01) | |
| G06Q 30/08 | (2012.01) | |
| G08G 1/123 | (2006.01) | |
| G07C 5/00 | (2006.01) | |

(52) U.S. Cl.
CPC ......... *G05D 1/0276* (2013.01); *G05D 1/0282* (2013.01); *G06Q 30/0611* (2013.01); *G06Q 30/0613* (2013.01); *G06Q 30/08* (2013.01); *G07C 5/00* (2013.01); *G08G 1/123* (2013.01); *G05D 2201/0213* (2013.01)

(58) Field of Classification Search
None
See application file for complete search history.

(56) References Cited

U.S. PATENT DOCUMENTS

| 5,448,479 A | 9/1995 | Kemner et al. |
|---|---|---|
| 8,352,111 B2 | 1/2013 | Mudalige |
| 2003/0195813 A1 * | 10/2003 | Pallister ............ G06Q 20/102 705/26.3 |
| 2006/0059023 A1 * | 3/2006 | Mashinsky ........... G06Q 10/02 705/5 |

(Continued)

FOREIGN PATENT DOCUMENTS

| CA | 2369768 C | 8/2002 |
|---|---|---|
| CA | 2372900 | 5/2003 |

(Continued)

OTHER PUBLICATIONS

Lin Edwards, SARTRE Car Platoon Road Test to Begin, Dec. 10, 2010, PhysOrg.com.

(Continued)

*Primary Examiner* — Lail Kleinman
(74) *Attorney, Agent, or Firm* — Lempia Summerfield Katz LLC

(57) ABSTRACT

An autonomous vehicle may be partially controlled or monitored by a remote endpoint assigned to the autonomous vehicle. The autonomous vehicle sends one or more assisted driving messages directly to the autonomous vehicle or through a server. The server may identify multiple potential remote driving endpoints and assign one or more of the potential remote driving endpoints to the autonomous vehicle. The one or more potential remote driving endpoints return a command to the autonomous vehicle directly or through the server.

17 Claims, 11 Drawing Sheets

(56) References Cited

U.S. PATENT DOCUMENTS

| | | | |
|---|---|---|---|
| 2013/0246207 A1* | 9/2013 | Novak | G06Q 30/0283 |
| | | | 705/26.2 |
| 2013/0246301 A1* | 9/2013 | Radhakrishnan | G06Q 30/0282 |
| | | | 705/347 |
| 2013/0338854 A1 | 12/2013 | Yamamoto | |
| 2014/0207535 A1* | 7/2014 | Stefan | G05D 1/0022 |
| | | | 705/7.42 |
| 2015/0248131 A1* | 9/2015 | Fairfield | G05D 1/0044 |
| | | | 701/2 |

FOREIGN PATENT DOCUMENTS

| | | |
|---|---|---|
| DE | 102011012551 A1 | 8/2012 |
| EP | 2674907 A1 | 12/2013 |
| WO | WO2011068805 A | 6/2011 |
| WO | WO2013006826 A2 | 1/2013 |

OTHER PUBLICATIONS

Steven Ashley, Robot Truck Platoons Roll Forward, Apr. 10, 2013, bbc.com.

Swarun Kumar et al., A Cloud-Assisted Design for Autonomous Driving, 2012.

* cited by examiner

AUTONOMOUS VEHICLE MONITORING AND CONTROL

FIELD

The following disclosure relates to remote monitoring of an autonomous vehicle, or more particularly, to an assignment system for matching one or more remote monitoring endpoints to the autonomous vehicle.

BACKGROUND

The term autonomous vehicle refers to a vehicle including automated mechanisms for performing one or more human operated aspects of vehicle control. As autonomous vehicles are adopted, several benefits may be realized. Vehicle collisions may be reduced because computers can perform driving tasks more consistently and make fewer errors than human operators. Traffic congestion may be alleviated because autonomous vehicles observe specified gaps between vehicles, preventing stop and go traffic. The reduced traffic and increased safety may lead to higher speed limits.

Autonomous vehicles may allow drivers to focus their attention elsewhere, such as working on a laptop, talking on a phone, or sleeping. Impaired people that may otherwise be unable to drive may be able to operate an autonomous vehicle. Parking options in urban errors may be improved because autonomous vehicles may drop off passengers and then park in a more remote location.

However, situations may arise that cannot be reliably handled by autonomous vehicles and should be given the attention of a human operator.

SUMMARY

In one embodiment, an autonomous vehicle may be partially controlled or monitored by a remote endpoint assigned to the autonomous vehicle. The autonomous vehicle sends one or more assisted driving messages directly to the autonomous vehicle or through a server. The server may identify multiple potential remote driving endpoints and assign one or more of the potential remote driving endpoints to the autonomous vehicle. The one or more potential remote driving endpoints return a command to the autonomous vehicle directly or through the server.

BRIEF DESCRIPTION OF THE DRAWINGS

Exemplary embodiments of the present invention are described herein with reference to the following drawings.

DETAILED DESCRIPTION

An autonomous vehicle refers to a fully autonomous vehicle, a partially autonomous or semi-autonomous vehicle, or another advanced driving assistance system (ADAS). Autonomous vehicles may be configured to be driven in a manual mode, in which where the operator exercises a high degree of control over the movement of the vehicle, or in autonomous mode, in which the vehicle essentially drives itself with limited assistance from the driver. A vehicle in autonomous mode may be referred to as a highly assisted driving vehicle or HAD vehicle.

A fully autonomous vehicle is capable of sensing environmental data or receiving environmental data and navigating without human input and only prompts for user involvement when an error or other dangerous condition occurs. A partially autonomous vehicle may receive environmental data and perform a limited set of driving actions based on the data, but require human input for some actions. Other ADAS systems may include some combination of driving actions without human involvement.

The various types of autonomous vehicles may request input from a human operator or issue messages that present information to a human operator who may choose to provide an input to the autonomous vehicle. The human operator may sit in the driver's seat and monitor these messages or wait until a situation requiring human input presents itself. However, this defeats one of the primary purposes of autonomous vehicles, freeing up the driver for other activities. It is a time consuming, tiresome, and energetic assignment for a human driver to sit at the steering wheel of an autonomously driven vehicle only to monitor, administer, and respond to car warning and alerts. The driver may prefer to read, talk on the phone, drink coffee, apply makeup, or sleep rather than monitor the messages.

The following examples provide systems to offload or outsource message monitoring to another person. In one example, an auction based system is applied to the autonomous vehicle. The auction based system allows potential drivers that are remote from the autonomous vehicle to offer or bid to monitor the sensors, warning messages, or alerts on the autonomous vehicle on behalf of the driver. The term remote may refer to drivers that are outside of the vehicle or more than a predetermined distance (e.g., 100 meters, 1 mile, or another distance) from the vehicle. The alerts may indicate that sharp curves are approaching or the road ahead may have ice or snow patches. The alert may cause the vehicle 124 to honk the horn when the remote driver sees through a camera on the vehicle 124 that a person or deer is standing in the roadway.

Figure 1:
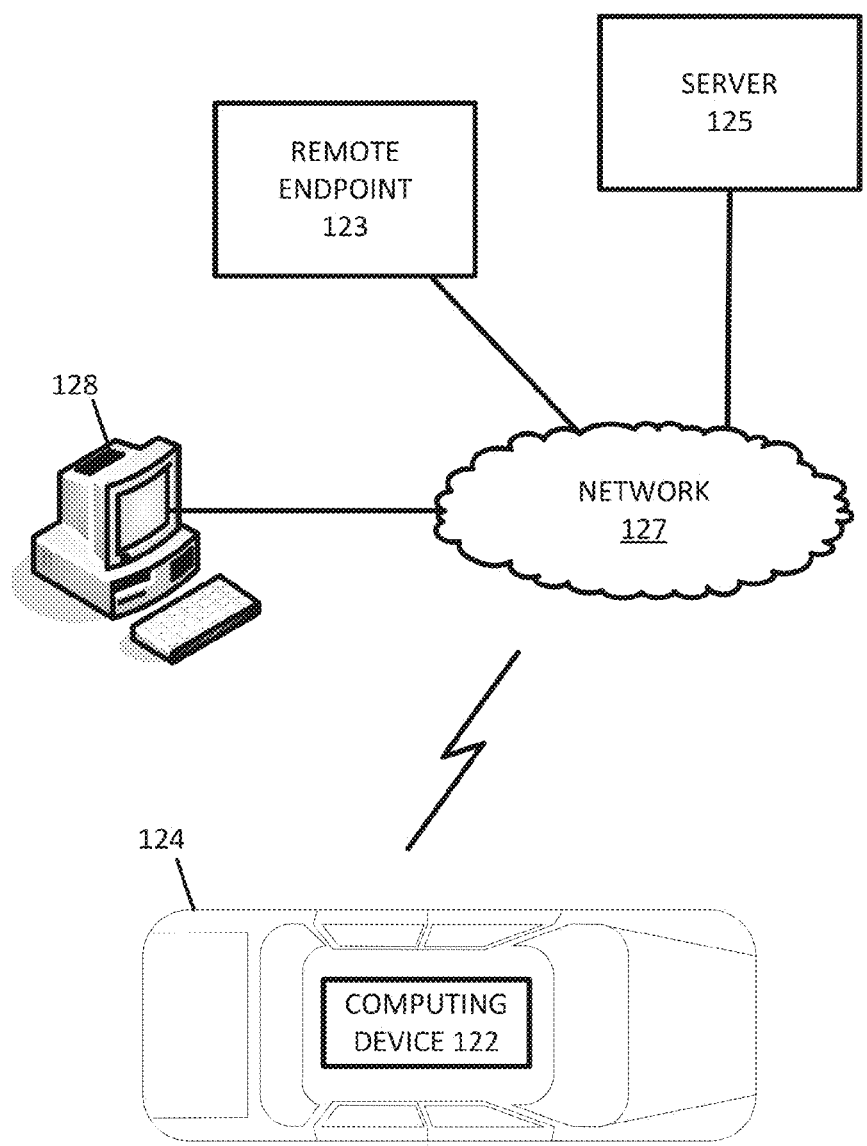
FIG. 1 illustrates an example system for remote monitoring of an autonomous vehicle.

FIG. 1 illustrates an example system 120 for remote monitoring of an autonomous vehicle. The system 120 includes one or more computing devices 122, a server 125, a remote endpoint 123, a workstation 128, and a network 127. Additional, different, or fewer components may be provided. For example, many computing devices 122 and/or workstations 128 connect with the network 127.

The computing device 122 may be carried by an autonomous vehicle 124. The computing device 122 may be a specialized autonomous driving computer. The computing device 122 may be a mobile device (e.g., a smart phone, a mobile phone, a personal digital assistance, a tablet computer, a navigation device, a laptop and/or any other known or later developed portable or mobile computing device) that interacts with an autonomous driving computer or directly with an engine control unit and driving control unit of the vehicle 124.

The computing device 122 may receive environment data and operation data for the vehicle 124. The environment data may include sensors mounted on the vehicle, sensors mounted along the roadway, or sensors mounted on other vehicles. The environment data may include traffic speeds, or weather (e.g., temperature, humidity, precipitation, or other data). The environment data may include navigational data as a function of the current location of the vehicle (e.g., routing, or the shape or slope of upcoming roads). The operation data may describe the operation of the vehicle such as speed, acceleration, heading, or relative lane position.

The computing device 122 may generate driving commands based on the environment data and the operation data. The driving commands may include instructions for the vehicle 124 to speed up, slow down, brake, turn, change gears, or other driving commands. The operation data may include the responsiveness of the vehicle 124 (e.g., whether an instruction for the vehicle to speed up, slow down, or turn leads to the desired result).

The computing device 122 may generate assisted driving messages based on the environment data or operation data. The assisted driving messages may include warnings of hazards or specific types of upcoming driving conditions. The upcoming driving conditions may depend on the navigational data describing the upcoming path (e.g., traffic incident, school zone, or sharp curve). The upcoming driving conditions may depend on environmental data describing conditions (e.g., icy road or rain). The hazard warnings may describe the operation of the vehicle 124 (e.g., braking is not responsive or another vehicle is too close).

The server 125 may receive one or more assisted driving messages from the computing device 122 of the vehicle 124 and forward the assisted driving messages to the remote endpoint 123. The server 125 may identify or select the remote endpoint 123 using a variety of techniques. In one example, the vehicle 124 and the remote endpoint 123 are associated in a database based on a contractual relationship, a past successful relationship, or a request by the computing device 122.

In another example, the server 124 may identify a group of potential remote endpoints that are available. The computing device 122 may submit the planned route for monitoring to the server 124, and the server 124 may select the specific remote endpoint 123 from the group of potential remote endpoints that are available based on the route duration or starting time. The server 124 may select the specific remote endpoint 123 form the group of potential remote endpoints based on a profile of the remote endpoints. The profile may include ratings, performance, or workload of the available remote endpoints. The server 124 may select the specific remote endpoint 123 form the group of potential remote endpoints according to bids submitted by the potential remote endpoints for costs of monitoring the route submitted by the computing device 122. The computing device 122 may also submit to the server 125 an amount of the maximum acceptable bid.

Once the server 125 has assigned the remote endpoint 123 to the autonomous vehicle 124, the server 125 forwards or sends the one or more assisted driving messages to the remote driving endpoint 123. The user of the remote endpoint 123 returns a command directly to the computing device 122 or through the server 125. The command may dismiss or acknowledge the assisted driving message. The command may be a driving command that instructs the computing device 122 to operate the vehicle 124 (e.g., speed up, slow down, brake, turn, or operate an accessory). The command may escalate the assisted driving message to alert one of the passengers of the vehicle 124. The command may instruct the computing device 122 to send a message to the passengers that no dangerous condition exists.

The optional workstation 128 is a general purpose computer including programming specialized for the following embodiments. For example, the workstation 128 may receive user inputs for the types of assisted driving messages that are generated and forwarded to the remote driving endpoint 123. The workstation 128 may receive inputs for the maximum acceptable bid and/or start time when selecting the remote driving endpoint. The workstation 128 may receive inputs for defining a destination and/or an origin for a route in need of a remote driving endpoint 123.

The developer system 121, the workstation 128, and the computing device 122 are coupled with the network 127. The phrase "coupled with" is defined to mean directly connected to or indirectly connected through one or more intermediate components. Such intermediate components may include hardware and/or software-based components.

The computing resources may be divided between the server 125 and the computing device 122. In some embodiments, the server 125 performs a majority of the processing for determining the assisted driving messages. In other embodiments, the computing device 122 or the workstation 128 performs a majority of the processing. In addition, the processing is divided substantially evenly between the server 125 and the computing device 122 or workstation 128.

Figure 2:
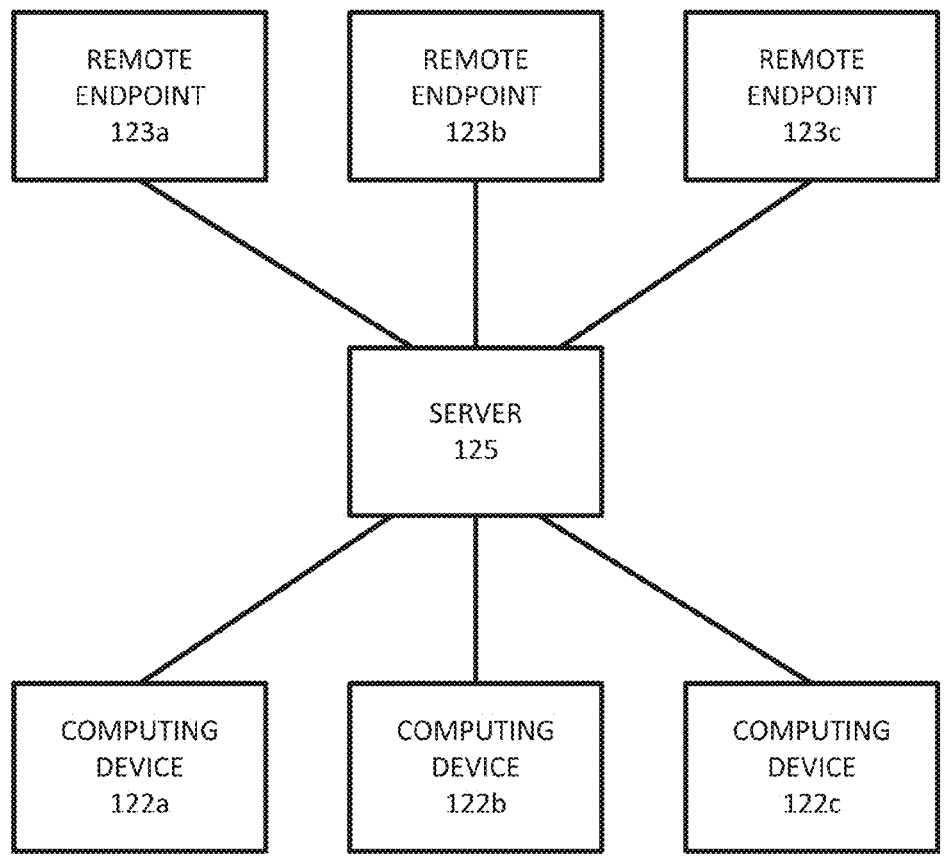
FIG. 2 illustrates example network of remote monitoring endpoints and computing devices of autonomous vehicles.

FIG. 2 illustrates example network of remote monitoring endpoints 123*a-c* and computing devices 122*a-c*. Any number of remote monitoring endpoints may be in communication with the server 125 and any number of computing devices may be in communication with the server 125.

Users of the remote monitoring endpoints 123*a-c* may submit applications either to server 125 or a screening service to apply to work as a remote monitor for autonomous driving. The potential users may be tested for driving laws and customs of various countries, quick response or reflex times, and logic or reasoning. The potential users may be presented with recorded autonomous driving sequences (e.g., actual vehicle driven routes) so that their responses are compared to experienced remote monitors. The tests may be presented when new remote users apply, periodically for all users (e.g., weekly or monthly), at random times, or just before each assignment with an autonomous vehicle is made. The server 125 may assign various initial grades to the remote monitoring endpoints 123*a-c* based on their performance on the tests. Some remote monitoring endpoints 123*a-c* may only be approved to monitor autonomous vehicles in certain countries or certain types of areas (e.g., right hand traffic areas driving is on the right side of the road or left hand traffic areas where driving is on the left side of the road).

The remote monitoring endpoints 123*a-c* may be grouped according to vehicle manufacturer. Some remote monitoring endpoints may be trained and authorized by individual vehicle manufacturers. Thus, remote monitoring endpoint 123*a* may only be assigned to cars from a first vehicle manufacturer and remote monitoring endpoint 123*b* may only be assigned cards from a second vehicle manufacturer. Different manufacturers may have different tests for certifying remote users for autonomous driving. Vehicles from different manufacturers may have different driving assistance messages and different commands available to the remote users.

The remote monitoring endpoints 123a-c may be grouped according to type of vehicle. Example types of vehicle include sedan, couple, van, truck, hybrid, electric, and roadster. The vehicle types may be divided into functions such as passenger cars, payload trucks, and high occupancy vehicles. Different tests and certification procedures may be used for different types of vehicles. Vehicles of different types may have different driving assistance messages and different commands available to the remote users.

The remote monitoring endpoints 123a-c may be grouped according to type of service provider for autonomous driving. The service provider for autonomous driving may be the provider of an aftermarket computing device 122 for autonomous driving. The service provider may provide the service that connects the computing device to the remote monitoring endpoints 123a-c. Different services may have different driving assistance messages and different commands available to the remote users.

The remote monitoring endpoints 123a-c may be located in a variety of geographic locations. Some locations may be associated with lower costs for the remote monitoring endpoints 123a-c. For example, some areas may have lower labor costs or minimum wages than other areas. The user of the computing device 123a-c may specify specific countries or regions permissible when matching with the remote monitoring endpoints 123a-b. In other examples, the identities or locations of the remote monitoring endpoints 123a-b may be hidden from the computing device 123a-c even after assignment.

The remote monitoring endpoints 123a-c may be authenticated based on the computing resources available at each potential monitoring endpoint. The potential monitoring endpoints may be provided with a computing resources test from the server 125 to demonstrate the bandwidth, processing power, power backup availability, response time, or ping time. The server 125 may receive test results from the potential monitoring endpoints and compare the test results to a computing resources threshold or individual thresholds for bandwidth, processing power, power backup availability, response time, and/or ping time.

In some examples, multiple of the remote monitoring endpoints 123a-c may be assigned to a single computing device 122a. The same set of assisted driving messages may be sent to the multiple remote monitoring endpoints. The server 125 may receive parallel commands from the remote monitoring endpoints and compare the commands to one another.

For example, if one remote endpoint issues a command to brake the vehicle 124, but the other two remote endpoints do not, the server 125 may ignore (e.g., drop or delete the associated data packets) the command to brake the vehicle 124. In one example, the server 125 may attempt to match driving commands from multiple remote endpoints and forward commands to the computing device 122 only when a predetermined number (e.g., 2, 4, or another value) of the commands match or are considered equivalent. An example of equivalent commands may be "speed up by X" and "speed up by X+1" or "turn 3 degrees" and "turn 4 degrees." Utilizing parallel remote endpoints or other forms of crowdsourcing provides redundancy and additional safety into the autonomous driving system. If one of the remote users has a technical problem, a medical problem, or chooses to stop monitoring the assisted driving messages, another remote user may still provide accurate commands to the vehicle 125, which may prevent errors or injuries from occurring.

Figure 3:
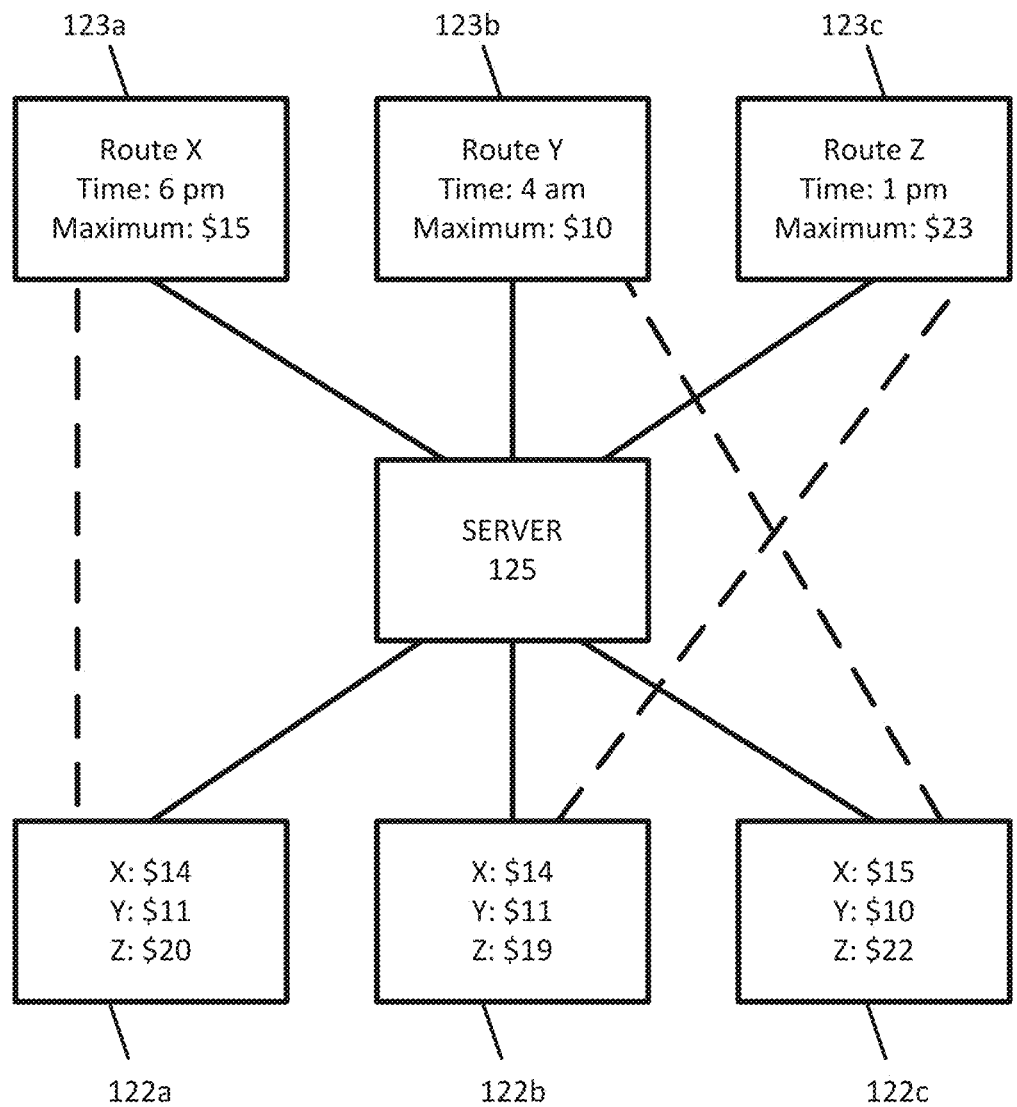
FIG. 3 illustrates example assignments for remote monitoring endpoints.

FIG. 3 illustrates example assignments for the remote monitoring endpoints 123a-c and the computing devices 122a-c. The dotted lines in FIG. 3 illustrate that remote monitoring endpoint 123a and computing device 122a are assigned to one another by the server 125, remote monitoring endpoint 123b and computing device 122c are assigned to one another by the server 125, and remote monitoring endpoint 123c and computing device 122b are assigned to one another by the server 125. The server 125 may execute a variety of algorithms for determining the assignments.

In one example, the server 125 employs an auction based algorithm. The auction based algorithm allows the computing device 122 (e.g., via an autonomous vehicle owner or driver) to list a maximum price that is acceptable for a particular route for the vehicle 124 at a specific time. The price may be in a specific currency (e.g., U.S. dollar, Euro, or bitcoins) or list multiple currencies. The specific time may be a time range. Multiple times and associated prices may be listed.

The remote monitoring endpoints 123a-c may receive any combination of the maximum price, route, and time ranges and submit bids for the work of monitoring the vehicle 124. The remote monitoring endpoints 123a-c may be in multiple locations across the world, use different currencies, and work in different time zones.

The server 125 or the computing device 122 may select the remote monitoring device to be assigned to the vehicle 124. In one example, the first remote monitoring device that is certified and within the maximum price is selected. In another example, the server 125 leaves the auction open for a predetermined amount of time (e.g., 10 seconds, 1 minute, 10 minutes, or another value) and the lowest certified bid during the predetermined amount of time is selected. In another example, the submitted bids are sent to the computing device 122 and a user provides an input to the computing device 122 to select one of the remote monitoring devices. In addition to the bids, profile information (e.g., monitoring history, bidder's location, bidder's age, or other information) for the respective remote users may be sent to the computing device 122.

In one example, the server 125 receives an availability schedule from one or more of the remote monitoring endpoints 123a-c. The availability schedule may specific times of day, days of week, or specific time ranges that the respective user is available to monitor driving assistance messages. The server 125 may filter received requests from the computing devices 122a-c so that only available remote users receive the options to place bids. The server 125 may modify the availability schedule so that any one remote monitoring endpoint 123 can only work a predetermined number of hours in a day (e.g., 6, 8, or 10) or week (e.g., 40) or a predetermined number of days per week. The predetermined numbers may be defined according to local laws at the computing device location or at the remote monitoring endpoint location.

In one of the algorithms for determining the assignments, the server 125 may assign the lowest bid to each submission in the order the submissions are received. In another one of the algorithms for determining the assignments, the server 125 may first prioritize that all submissions from computing devices are assigned to one of the remote monitoring endpoints 123a-c. For example, if remote monitoring endpoint 123a is the only bid for computing device 122a, the two may be matched, even if remote monitoring endpoint 123*a* is also the best bid for computing device 122*b* because remote monitoring endpoints 123*b* has also submitted a bid for computing device 122*b*. In another one of the algorithms for determining the assignments, the server 125 may prioritize that the overall total cost is minimized.

The server 125 may also function as a payment server. The payment server charges the computing device 122 (or associated driver or autonomous vehicle user) the fee or price of the winning bid. In one implementation, each of the computing devices 122*a-c* and remote monitoring endpoints 123*a-c* has an account with the payment server. Thus payment may be automatically transferred by the payment server. The payment may be converted between local currencies or virtual currencies. The payment server may retain a fee for the transfer. In another implementation, the computing device 122 (or associated driver or autonomous vehicle user) maintains an onboard credit card which can be queried for balance and billed automatically. Billing can occur before, during, or after the monitoring and control service is provided.

Figure 4:
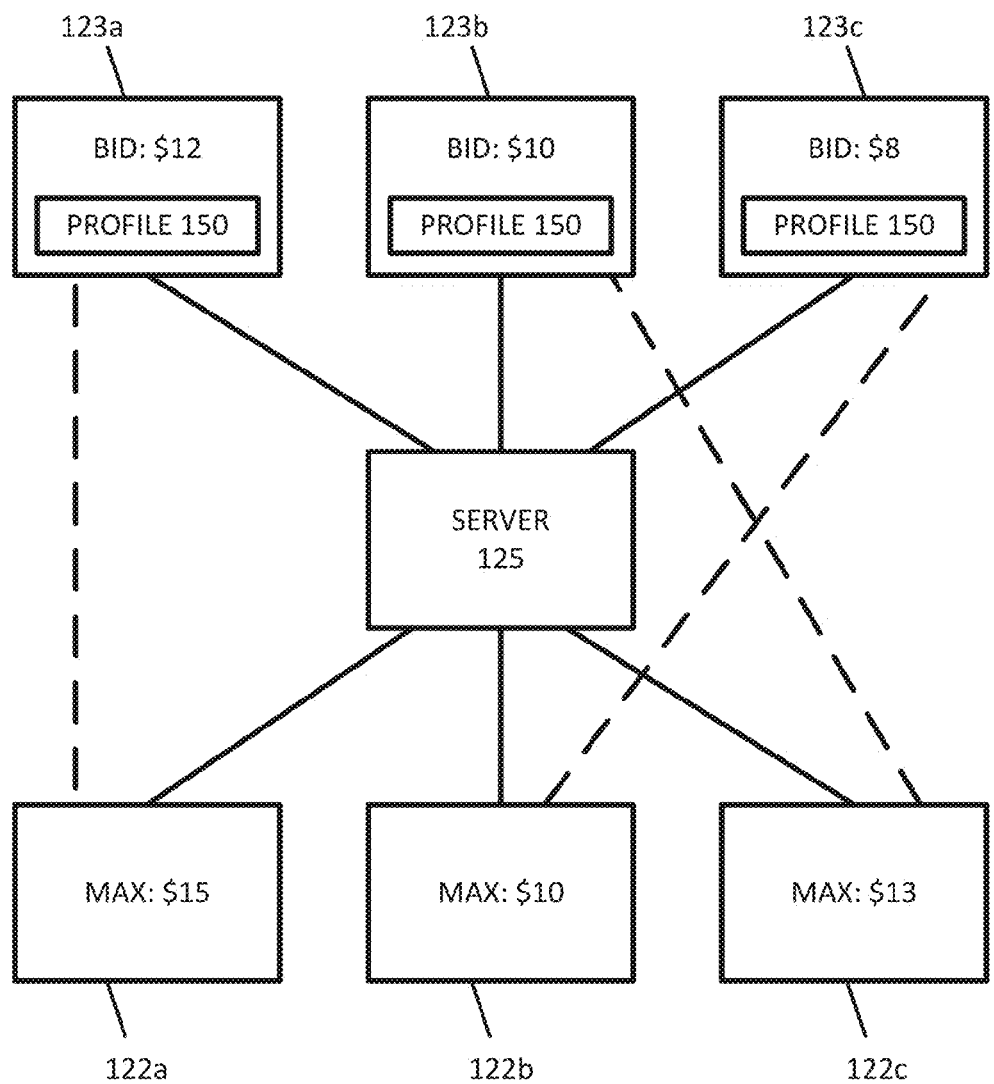
FIG. 4 illustrates example assignments for remote monitoring endpoints.

FIG. 4 illustrates additional example assignments for remote monitoring endpoints 123*a-c*. Each of the computing device 122*a-c* may submit a maximum price for a predetermined unit of remote monitoring. The predetermined unit may be based on time (e.g., 15 minutes, 1 hour, or another value) or distance (e.g., 10 kilometers, 10 miles, or another value). The server 125 may send only the maximum price to the remote monitoring endpoints 123*a-c* because the predetermined unit is standardized.

The remote monitoring endpoints 123*a-c* may return to the server 125 a bid price and a profile 150 or only the profile 150. The server 125 may store the profiles for the remote monitoring endpoints 123*a-c* in a database. The profiles include information for describing the users of the remote monitoring endpoints 123*a-c*, their performance, and other information.

Figure 5:
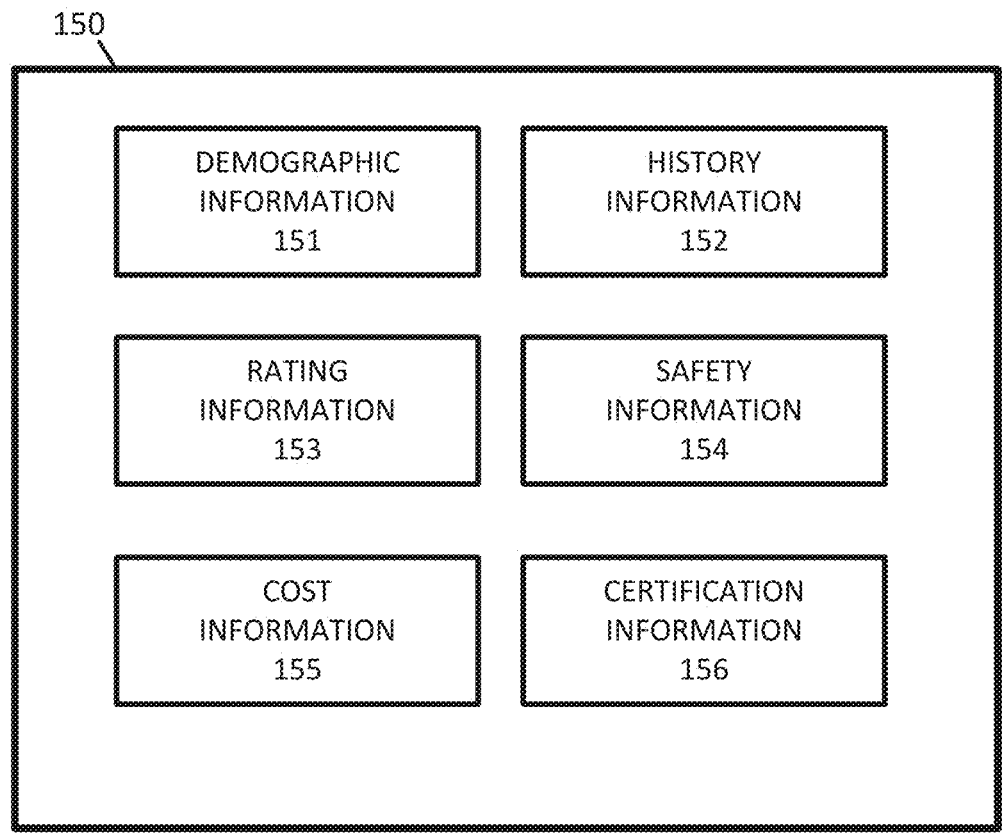
FIG. 5 illustrates example profiles for the remote endpoints.

FIG. 5 illustrates example profiles 150 for the remote monitoring endpoints 123*a-c*. The profiles 150 may include any combination of demographic information 151, history information 152, rating information 153, safety information 154, cost information 155, and certification information 156. Additional, different, or less information may be included in the profiles 150. In one example, the profile 150 may be divided into a personal profile (e.g., demographic information 151) and a driver profile (e.g., any combination of history information 152, rating information 153, safety information 154, cost information 155, and certification information 156).

The demographic information 151 may include the name, age, birthdate, years of service, or location of the user of the remote monitoring device. The demographic information 151 may include geographic data such as the city, country, or time zone of the user of the remote monitoring device. The demographic information 151 may include a photograph of user of the remote monitoring device.

The history information 152 may include measured performance of the user of the remote monitoring device. The measured performance may include the distance driven by the user of the remote monitoring device. The measured performance may include attendance or lateness data. The attendance data may describe a percentage of completed monitoring sessions out of total sent and accepted bids. The lateness data may describe a percentage of total sent and accepted bids in which the remote user was not available at the promised time but soon thereafter (e.g., within a tardiness time frame of 1 minute, 5 minutes, or another value).

The rating information 153 may include a compilation of feedback provide by the computing device 122*a-c* to rate or grade the users of the remote monitoring devices 123*a-c*. The grades may include a broad range (e.g., grades A, B, C, and D) or a percentage of positive ratings. When a route is complete (e.g., vehicle 124 arrives at the destination), the server 125 may sent a survey message to the computing device 122 for the driver or passenger of the vehicle 124 to provide feedback on the remote monitoring device 123. The feedback may include a numerical rating and comments. The feedback include a selection from a predetermined selection of problems (e.g., dangerous condition occurred without warning, remote monitor was late, remote monitor was non-responsive, trip was delayed, warning was issued without justification, or other messages).

The safety information 154 may describe the performance of the total sent and accepted bids. The performance may be the number of accidents that occur on the watch of the remote monitoring devices 123*a-c*. The performance may be the number of occurrences that the driver of the vehicle has to take manual control of the vehicle. The performance may describe the number of times that the remote monitoring devices 123*a-c* lose contact with the server 125 or the monitored computing device 122.

The cost information 155 may describe the average price or charge incurred by the remote monitoring devices 123*a-c*. The certification information 156 may describe the manufacturers that the remote user is authorized to monitor. The certification information 156 may describe the types of vehicles that the remote user is authorized to monitor. The certification information 156 may describe the countries, geographic regions, or driving conventions that the remote user is authorized to monitor.

The computing device 122*a-c* may select a remote monitoring device or accept a bid based on any of the information in the profiles 150. For example, a computing device 122 may limit remote monitoring devices 123*a-c* that are able to submit bids for monitoring message from the vehicle 124. The computing device 122 may instruct the server 125 to filter communications to the remote monitoring devices 123*a-c* based on any combination of demographic information 151, history information 152, rating information 153, safety information 154, cost information 155, and certification information 156. In some specific examples, the routes sent to the remote monitoring devices 123*a-c* may be filtered based on a number of miles driven, the frequency of accidents, the frequency of being late for an autonomous vehicle monitoring task, or rating.

The computing device 122 may submit a preference order for the server 125 to use when selecting remote monitoring devices 123*a-c*. For example, the computing device 122 may prefer the bid with the lowest accident rate or the most experience (miles driven). Alternatively, the computing device 122 may prefer the bid coming from the closest time zone or, alternatively, a time zone that is currently in business hours (e.g., 8 A.M. to 5 P.M.) or outside of twilight hours (e.g., 8 P.M. to 6 A.M. or the local times of sunset and sunrise).

Figure 6:
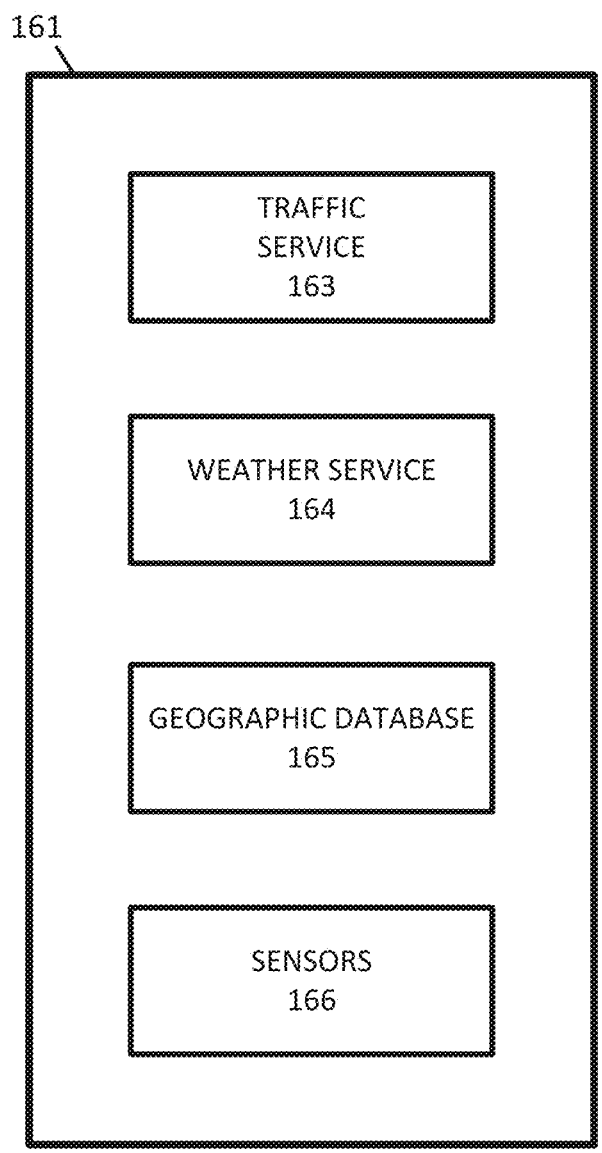
FIG. 6 illustrates example types of data sources for the autonomous vehicle.

FIG. 6 illustrates example types of data sources 161 for the autonomous vehicle 124. The data sources 161 may include a traffic service 163, a weather service 164, a geographic database 165, and sensors 166. Additional, different, or fewer data sources may be used. Data from the data sources may be stored at different locations including databases accessible through the network 127.

The traffic service 163 may send the computing device 122 current traffic conditions or predicted traffic conditions.

The traffic conditions may be selected according to the route. The computing device 122 may request traffic conditions for specific path segments. An example traffic service 163 is Traffic Message Channel (TMC), which broadcasts traffic incidents and traffic flow. Traffic delays may be caused by one or more of congestion, construction, accidents, special events (e.g., concerts, sporting events, festivals), weather conditions (e.g., rain, snow, tornado), and so on.

The traffic service 163 may store traffic conditions in a matrix, which may be send in whole or in part to the computing device 122. Entries in the matrix may correspond to time epochs. The time epochs may be associated with a time of day, day of week, and/or day of the year. Example sizes include 15 minutes, 30 minutes, 1 hour, or another value. Example time epochs include 5:00 pm-5:15 pm on a weekday, 10:00 am-11:00 am on a Saturday, and 2:00 pm-4:00 pm on the day before Thanksgiving. In the example of 15 minute epochs, the speed data may be formatted into a 96-dimensional vector for each cell of the, in which each of the 96 components describe speed data for a different 15 minute epoch. The size of matrix is a function of the size, or quantity, of the time epochs.

The weather service 164 may send the computing device 122 current weather conditions or forecast weather conditions. The weather conditions may be selected according to the route. The computing device 122 may request weather conditions for specific path segments. The weather conditions may include any combination of temperature, precipitation, and visibility. The weather conditions may indicate that vehicle 124 is currently experiencing freezing temperatures, rain, or fog. The weather conditions may indicate that based on the route, the vehicle 124 may soon experience freezing temperatures, rain, or fog.

The geographic database 165 may store or maintain geographic data such as, for example, road segment or link data records and node data records. The link data records are links or segments representing the roads, streets, or paths. The node data records are end points (e.g., intersections) corresponding to the respective links or segments of the road segment data records. The road link data records and the node data records may represent, for example, road networks used by vehicles, cars, and/or other entities. The road link data records may be associated with attributes of or about the roads such as, for example, geographic coordinates, street names, address ranges, speed limits, turn restrictions at intersections, and/or other navigation related attributes (e.g., one or more of the road segments is part of a highway or tollway, the location of stop signs and/or stoplights along the road segments), as well as points of interest.

The road link data attributes may include the position of the road, the curvature of the road, the banking angle of the road, the coefficient of friction of the road service, the grade of the road, and other physical and/or geometric attributes. The driver road link attributes may be further augmented using probe data that describes the actual driving behavior of drivers. The probe data may include information describe how people accelerate, decelerate, brake, or perform other actions while navigation a road segment or a particular curve on the road. Any of these attributes may be sent to the computing device 122 for determining the driving assistance messages.

The road link data attributes may also include functional classifications of the roads. One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size.

Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads. Additionally, the database 165 may list road width or lane quantities.

The functional classification of toad segments may be sent to the computing device 122 for determining the driving assistance messages. Different classifications of roads may have different threshold for types of weather, traffic, curvatures, and vehicle spacing that leads to a warning condition for a driving assistance message.

Figure 7:
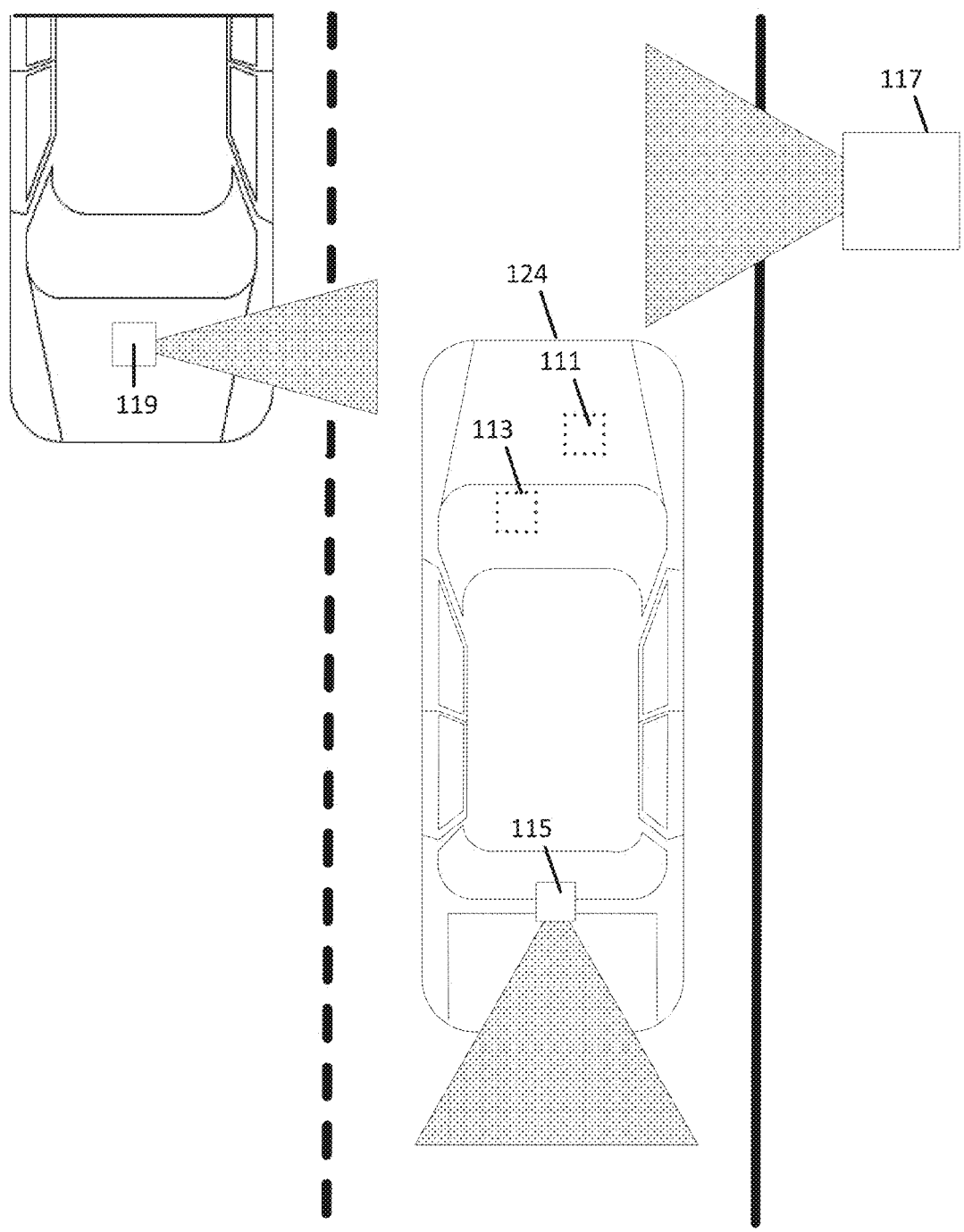
FIG. 7 illustrates example sensors for autonomous driving.

FIG. 7 illustrates example sensors 166 for autonomous driving. The sensors may be organized in to overlapping or non-overlapping categories. One classification of sensors includes internal vehicle sensors (e.g., sensors 111 and 113), external vehicle sensors (e.g., sensors 115 and 119), and stationary sensors (e.g., sensors 117). Another classification of sensors may include driving sensors (e.g., sensors 111, 113 and 115), road status sensors (e.g., sensors 115, 117, and 119), and parking sensors (e.g., sensors 111 and 113). Data from any of the sensors may be sent directly to the remote monitoring device 123 (e.g., streaming camera footage) or analyzed first at the computing device 122 or server 125 and only the analysis is sent to the remote monitoring device 123.

Engine sensors 111 may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Vehicle sensors 113 may include a steering wheel angle sensor, a speedometer sensor, or a tachometer sensor.

The external vehicle sensor 115 may be a camera, a light detection and ranging (LIDAR) sensor, a radar sensor, or an ultrasonic sensor. The external vehicle sensor 115 may determine road status such as the shape or turns of the road, the existence of speed bumps, the existence of pot holes, the wetness of the road, or the existence or ice, snow, or slush.

The secondary vehicle sensor 119 may be a camera, a LIDAR sensor, a radar sensor, or an ultrasonic sensor. The secondary vehicle sensor 119 may mounted on another vehicle. The secondary vehicle sensor 119 may be a backup sensor for detecting the speed of the vehicle 124. The secondary vehicle sensor 119 may detect the weather in the vicinity of the vehicle 124.

The stationary sensor 117 may be a camera, a LIDAR sensor, a radar sensor, or an ultrasonic sensor. The stationary sensor 117 may be a backup sensor for detecting the speed of the vehicle 124. The stationary sensor 117 may detect the weather in the vicinity of the vehicle 124. The stationary sensor 117 may detect traffic levels of the roadway.

One or more of the sensors may be weather sensors such as wiper blade sensors, rain sensors, temperature sensors, barometric sensors, or other types of sensors related to the weather. Rain, sleet, snow, fog, or barometric changes may be indicative of more hazardous driving. One or more of the sensors may include parking sensors. The parking sensor category may include any combination of seat belt sensors, door sensors, or a gear shift sensor. Various indicators from the parking sensors may be used to determine that the vehicle 124 is parking or moving away from a parking spot. The indicators may be fastening seatbelts, closings doors, or shifting to a higher gear.

Figure 8:
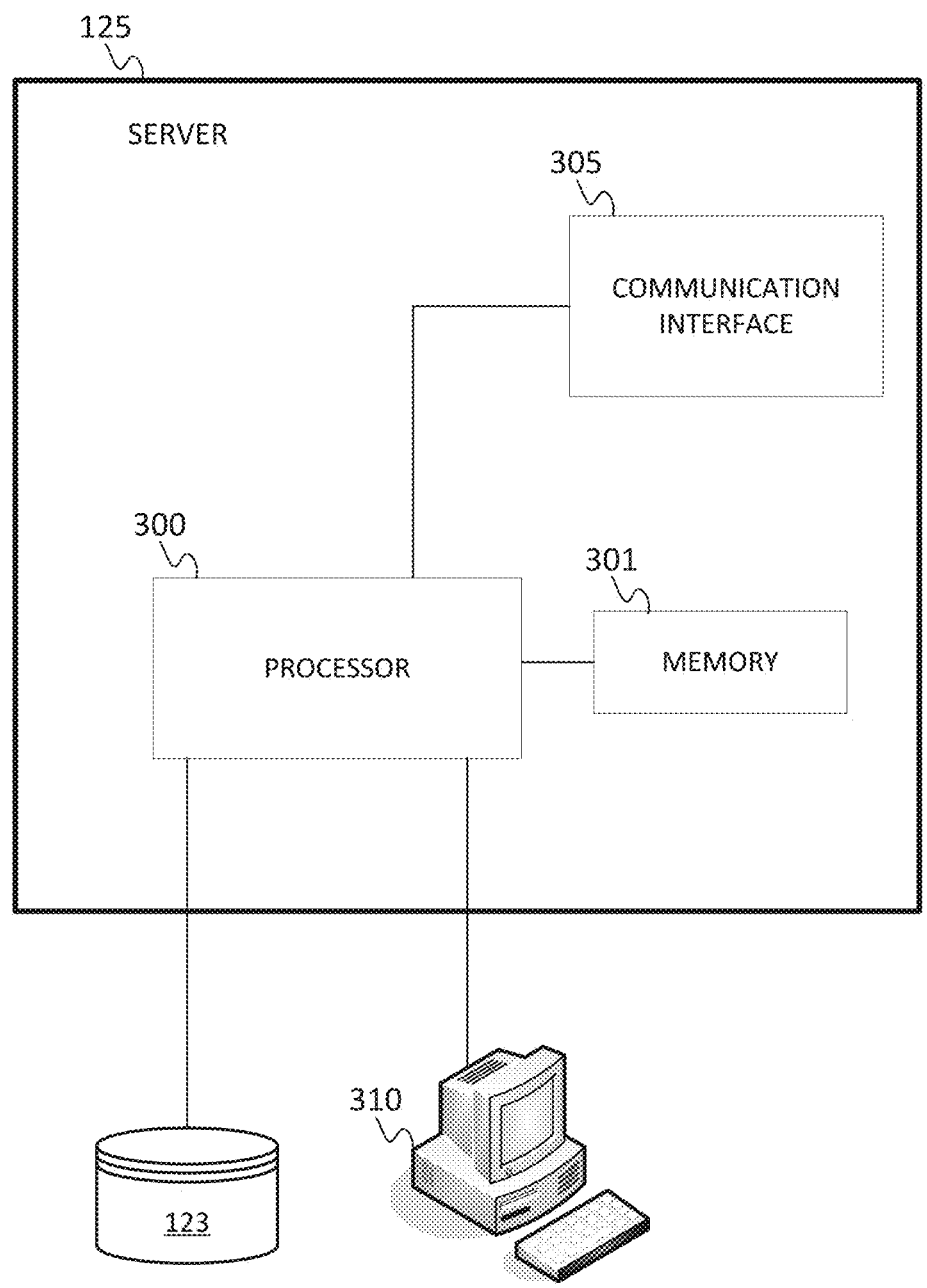
FIG. 8 illustrates an exemplary server of the system of FIG. 1.
Figure 9:
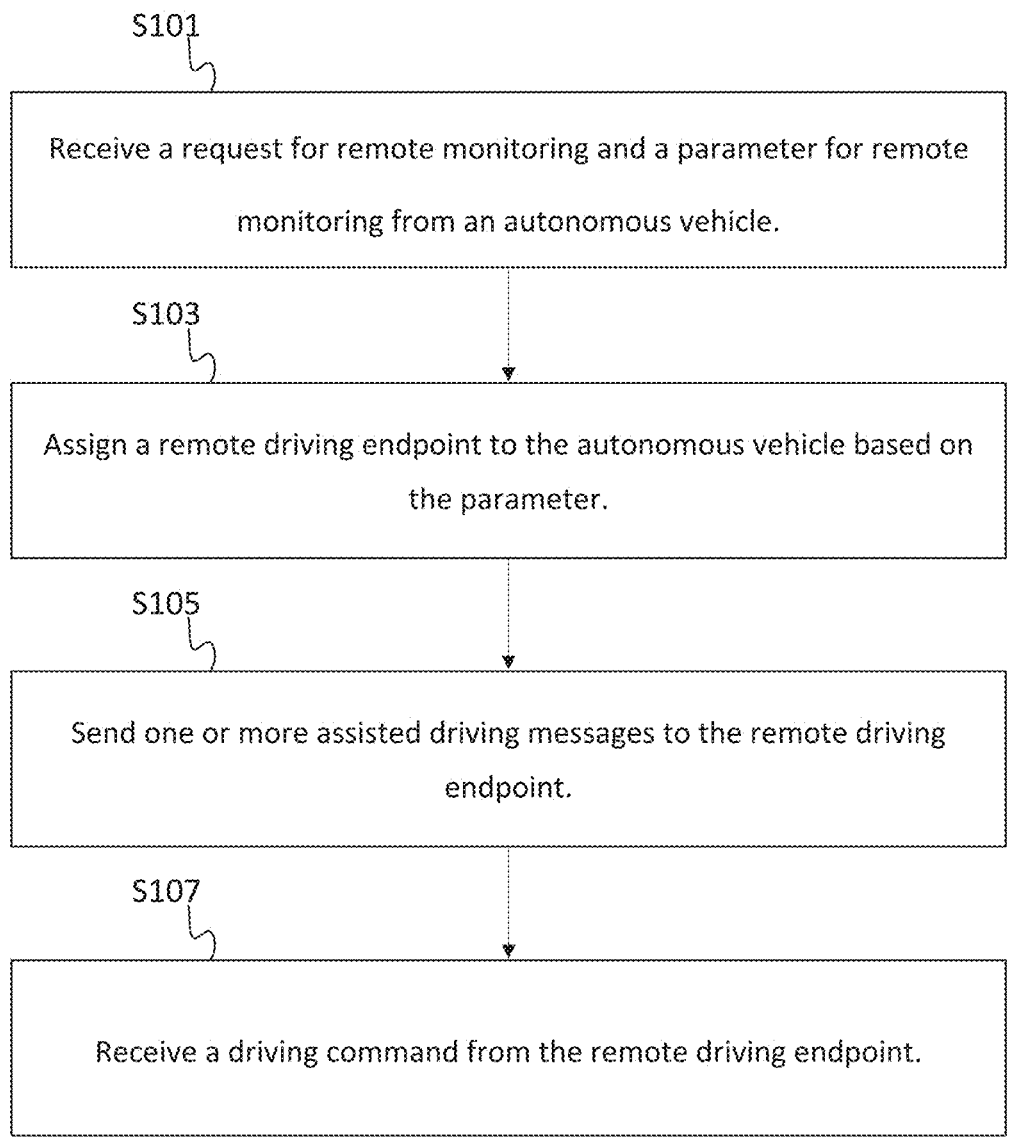
FIG. 9 illustrates example flowchart for remote monitoring of an autonomous vehicle.

FIG. 8 illustrates an exemplary server 125 of the system of FIG. 1. The server 125 includes a processor 300, a communication interface 305, and a memory 301. The server 125 may be coupled to a database 123 and a workstation 310. The workstation 310 may be used as an input device for the server 125. In addition, the communication interface 305 is an input device for the server 125. The communication interface 305 receives data indicative of use inputs made via the workstation 128 or the computing device 122. Additional, different, or fewer components may be included. FIG. 9 illustrates an example flowchart for dynamic traffic rendering. The acts of FIG. 9 may be performed by the server 125 or another device. Additional, different, or fewer acts may be provided.

At act S101, the processor 300 or communication interface 205 receives a request for remote monitoring and at least one parameter for remote monitoring from an autonomous vehicle. The parameter may include a route (e.g., a source or distance), a time (e.g., a start time or an acceptable start time range), and a price (e.g., a maximum price). The price may be an array of prices that includes a maximum price for different ratings or grades of remote monitoring providers. The parameter may also be a filter or a threshold for one or more attributes of potential remote monitoring providers. The attributes may be based a performance history (e.g., accident record, punctuality record, or experience).

At act S103, the processor 300 assigns a remote driving endpoint to the autonomous vehicle based on the at least one parameter. When the parameter is price, the processor 300 may select the potential remote monitoring provider with the lowest price. When the parameter is a threshold for performance rating or history, the processor 300 may select the remote monitoring provider with the lowest price from among those that meet or exceed the threshold. The processor 300 may also certify that the remote monitoring provider has sufficient computing resources (e.g., bandwidth) and has not exceeds a maximum number of daily or weekly monitoring sessions.

At act S105, the processor 300 or communication interface 305 sends one or more assisted driving messages to the remote driving endpoint. The assisted driving messages may be sent in a communication channel (e.g., cellular or another wireless technology) directly from the communication interface 305 to the remote monitor. The assisted driving messages may include real-time driving alerts, warning messages, and vehicular sensor information of the autonomous car.

The memory 301 may include a look up table that associates a combination of conditions (e.g., weather, traffic, incidents, road shape, or other factors) with predetermined driving assistance messages. The various conditions are considered in combination. For example, a curve may not justify a warning message unless a certain weather condition also exists.

At act S107, the processor 300 or communication interface 305 receives a driving command from the remote driving endpoint. The driving command may control may include functions such as steering, speed control, gear shifting, braking.

Figure 10:
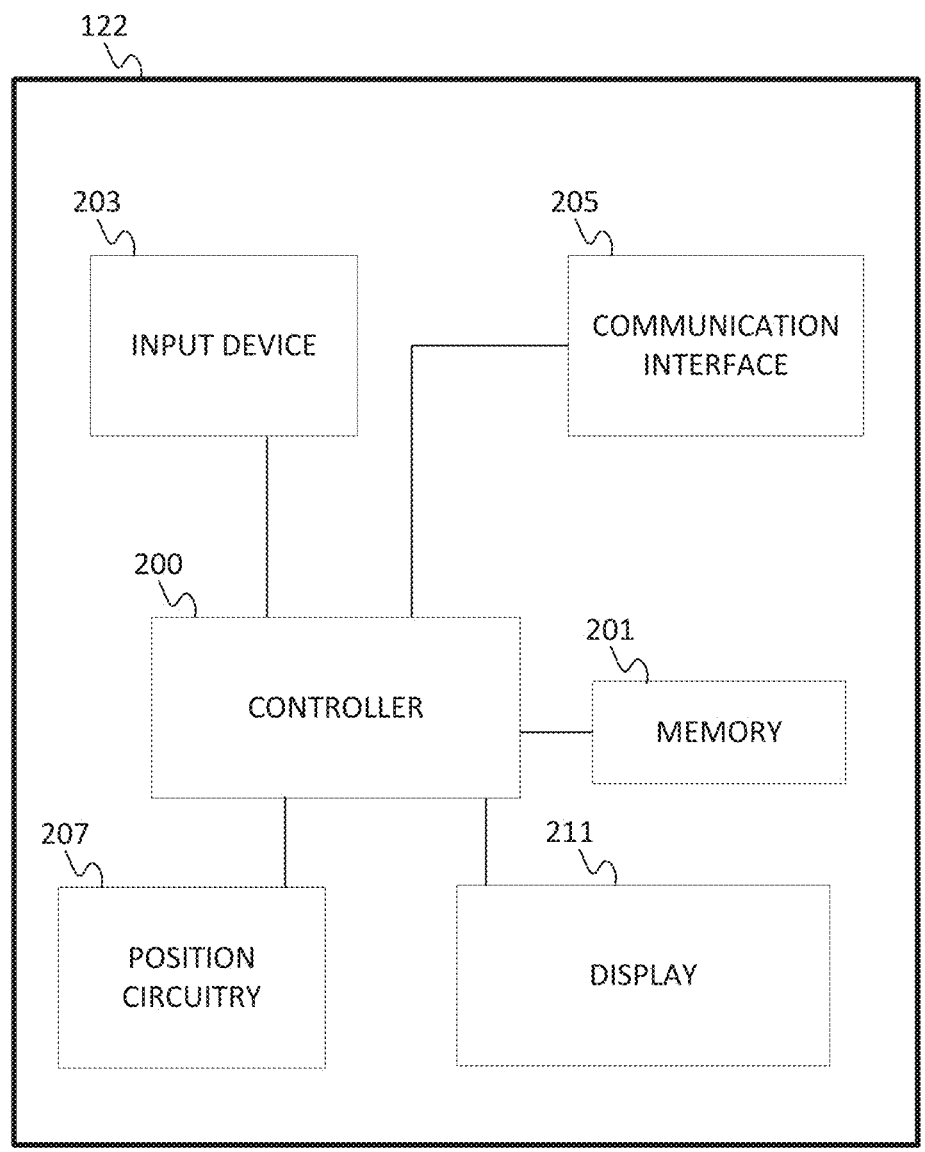
FIG. 10 illustrates an exemplary computing device of the system of FIG. 1.
Figure 11:
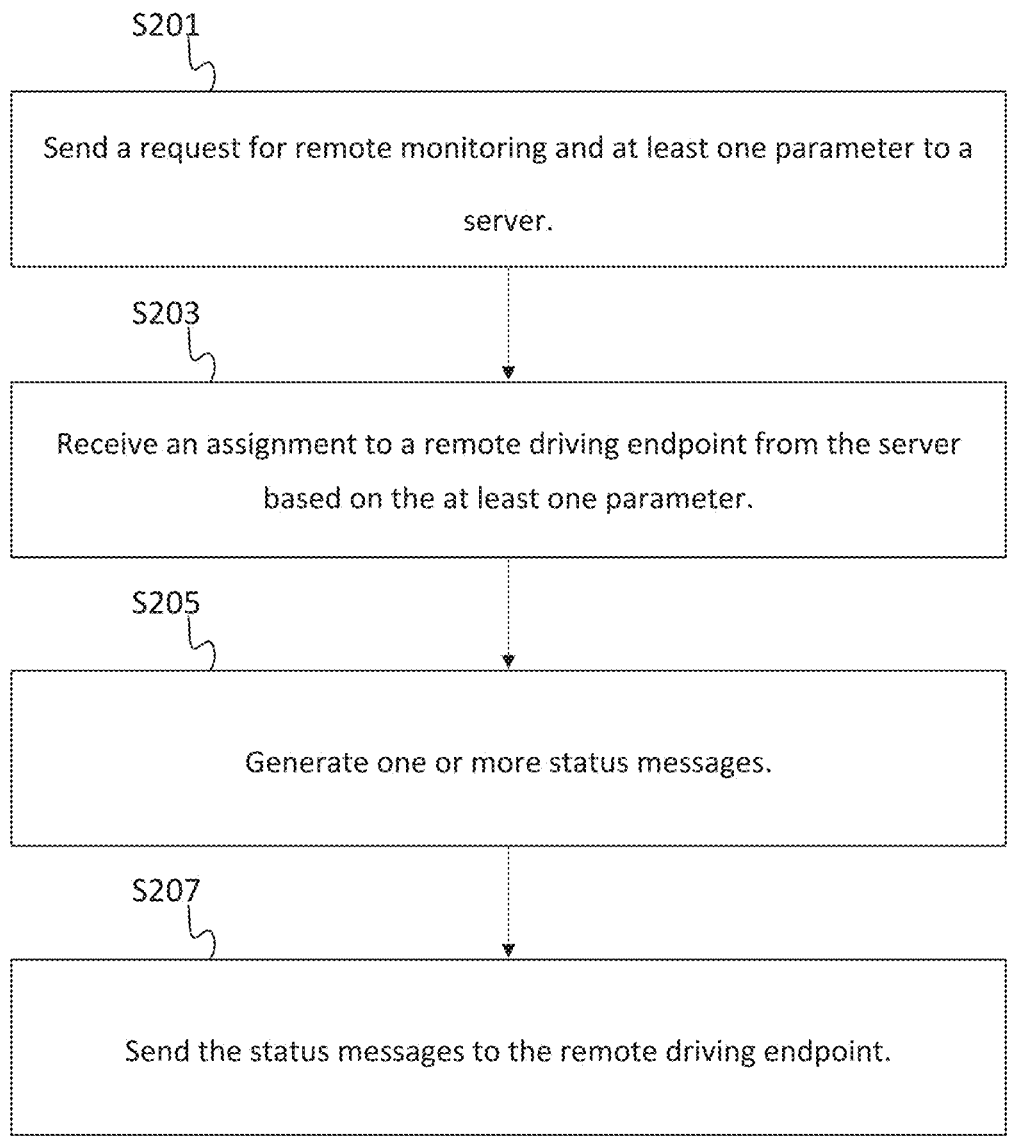
FIG. 11 illustrates another example for remote monitoring of an autonomous vehicle.

FIG. 10 illustrates an exemplary computing device 122 of the system of FIG. 1. The computing device 122 may be referred to as a navigation device. The computing device 122 includes a controller 200, a memory 201, an input device 203, a communication interface 205, position circuitry 207, and a display 211. The workstation 128 may include at least a memory and processor and may be substituted for the computing device 122 in the following. FIG. 11 illustrates an example flowchart for autonomous driving. The acts of FIG. 11 may be performed by the computing device 122 or another device. Additional, different, or fewer acts may be provided.

At act S201, the controller 200 or communication interface 205 sends a request for remote monitoring and at least one parameter to a server. The controller 200 may automatically determine when the request should be sent. For example, the request may be sent in response to starting the ignition of the autonomous vehicle or entering a destination into the navigation system of the autonomous vehicle. The request may be sent in response to a pre-scheduled routing performed by the autonomous vehicle such as driving to a nightly remote parking site, driving to a fuel or charging station when fuel or battery life reaches a predetermined low level, or driving to a weekly carwash station. The request may include the current position of the computing device 122 as determined by the position circuitry 207.

At act S203, the controller 200 or communication interface 205 receives an assignment for a remote driving endpoint from the server. The assignment is based on the at least one parameter including price, experience, or safety record, which may be entered via the input device 203. The assignment may be made to multiple remote driving endpoints and the input device 203 allows the driver of the autonomous vehicle to select a preferred remote driving endpoint.

At act S205, the controller 200 generates one or more assisted driving messages based on conditions data. The conditions data may include any combination of traffic conditions, upcoming traffic conditions, weather conditions, weather forecast conditions, and upcoming geographic conditions. The memory 201 may include a lookup table that associates combinations of conditions with warning messages or status messages. The status messages may describe potentially unsafe circumstances that the autonomous vehicle is experiencing or may experience in the future along the current route.

At act S207, the communication interface 205 sends the status messages to the remote driving endpoint. The communication interface 205 receives back a driving command or other type message from the remote driving endpoint that is presented on the display 211. The message may be an assurance from the remote driving endpoint that the vehicle alerts have been analyzed and the vehicle sensor data indicates that the driving condition of the autonomous vehicle is not dangerous. The driving command may operate the autonomous vehicle (e.g. send a brake pressure instruction or steering angle turn instruction).

The databases 123 may be maintained by one or more map developers (e.g., the first company and/or the second company). A map developer collects geographic data to generate and enhance the database. There are different ways used by the map developer to collect data. These ways include obtaining data from other sources such as municipalities or respective geographic authorities. In addition, the map developer may employ field personnel (e.g., the employees at the first company and/or the second company) to travel by vehicle along roads throughout the geographic region to observe features and/or record information about the features. Also, remote sensing such as, for example, aerial or satellite photography may be used.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The input device 203 may be one or more buttons, keypad, keyboard, mouse, stylus pen, trackball, rocker switch, touch pad, voice recognition circuit, or other device or component for inputting data to the computing device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

The positioning circuitry 207 is optional and may be excluded for the map-related functions. The positioning circuitry 207 may include GPS, Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the computing device 122. The positioning system may also include a receiver and correlation chip to obtain a GPS signal. Alternatively or additionally, the one or more detectors or sensors may include an accelerometer built or embedded into or within the interior of the computing device 122. The accelerometer is operable to detect, recognize, or measure the rate of change of translational and/or rotational movement of the computing device 122. The computing device 122 receives location data from the positioning system. The location data indicates the location of the computing device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 201 and/or memory 301 may be a volatile memory or a non-volatile memory. The memory 201 and/or memory 301 may include one or more of a read only memory (ROM), random access memory (RAM), a flash memory, an electronic erasable program read only memory (EEPROM), or other type of memory. The memory 201 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   identifying, using a processor, one or more remote driving endpoints;
   receiving a route from an autonomous vehicle;
   selecting, using the processor, a remote driving endpoint associated with a remote driving endpoint user, from a plurality of remote driving endpoints and based on the route received from the autonomous vehicle, wherein the remote driving endpoint is configured to monitor the an autonomous vehicle;
   receiving one or more assisted driving messages from the autonomous vehicle,
   wherein the one or more assisted driving messages describe one or more conditions of the autonomous vehicle;
   sending the one or more assisted driving messages to the remote driving endpoint; and
   receiving a command from the remote driving endpoint and based on the remote driving endpoint monitoring the autonomous vehicle through the one or more assisted driving messages.

2. The method of claim 1, further comprising:
   receiving a maximum price from the autonomous vehicle; and
   receiving a price bid from each of the one or more remote driving endpoints.

3. The method of claim 1, further comprising:
   receiving a time for a route from the autonomous vehicle, wherein the remote driving endpoint is assigned based on the time for the route.

4. The method of claim 1, further comprising:
   receiving an acknowledgement message for the remote driving endpoint from the autonomous vehicle.

5. The method of claim 1, further comprising:
   identifying a profile for each of the one or more remote driving endpoints; and
   comparing the profiles for the remote driving endpoints based on at least one preference associated with the autonomous vehicle.

6. The method of claim 1, further comprising:
   sending the command from the remote driving endpoint to the autonomous vehicle.

7. The method of claim 1, wherein the command is a driving command for the autonomous vehicle.

8. The method of claim 1, wherein the command is an audible alert.

9. The method of claim 1, wherein the autonomous vehicle is a semi-autonomous vehicle or fully autonomous vehicle.

10. An apparatus comprising:
at least one processor; and
at least one memory including computer program code for one or more programs; the at least one memory and the computer program code configured to, with the at least one processor, cause the apparatus to at least perform:
receiving a request for remote monitoring and at least one parameter for remote monitoring from an autonomous vehicle;
assigning a remote driving endpoint to the autonomous vehicle based on the at least one parameter;
sending one or more assisted driving messages to the remote driving endpoint; and
receiving a command from the remote driving endpoint, wherein the at least one parameter includes a route to a destination and a maximum price for monitoring assisted driving messages along the route to the destination.

11. The apparatus of claim 10, the at least one memory and the computer program code configured to, with the at least one processor, cause the apparatus to at least perform:
receiving bids from a plurality of remote driving endpoints; and
selecting the remote driving endpoint assigned to the autonomous vehicle based on the at least one parameter and the bids.

12. The apparatus of claim 10, the at least one memory and the computer program code configured to, with the at least one processor, cause the apparatus to at least perform:
receiving profiles from a plurality of remote driving endpoints; and
selecting the remote driving endpoint assigned to the autonomous vehicle based on the at least one parameter and the profiles.

13. The apparatus of claim 10, the at least one memory and the computer program code configured to, with the at least one processor, cause the apparatus to at least perform:
receiving schedules from a plurality of remote driving endpoints; and
selecting the remote driving endpoint assigned to the autonomous vehicle based on the at least one parameter and the schedules.

14. A method comprising:
identifying, using a processor, one or more remote driving endpoints;
assigning, using the processor, a remote driving endpoint and associated remote driving endpoint user to monitor an autonomous vehicle;
receiving one or more assisted driving messages from the autonomous vehicle, wherein the one or more assisted driving messages describe one or more conditions of the autonomous vehicle;
sending the one or more assisted driving messages to the remote driving endpoint;
receiving a command from the remote driving endpoint and based on the remote driving endpoint monitoring the autonomous vehicle through the one or more assisted driving messages; and
receiving a route or a time for the route from the autonomous vehicle, wherein the remote driving endpoint user is assigned based on the route or the time for the route.

15. The method of claim 14, further comprising:
sending the command from the remote driving endpoint to the autonomous vehicle.

16. The method of claim 14, wherein the command is a driving command for steering, speed adjusting, gear shifting, or braking the autonomous vehicle.

17. A method comprising:
identifying, using a processor, one or more remote driving endpoints;
assigning, using the processor, a remote driving endpoint to monitor an autonomous vehicle;
receiving one or more assisted driving messages from the autonomous vehicle,
wherein the one or more assisted driving messages describe one or more conditions of the autonomous vehicle;
sending the one or more assisted driving messages to the remote driving endpoint;
receiving a command from the remote driving endpoint and based on the remote driving endpoint monitoring the autonomous vehicle through the one or more assisted driving messages;
receiving a maximum price from the autonomous vehicle; and
receiving a price bid from each of the one or more remote driving endpoints;
wherein the assigning is based on a route received from the autonomous vehicle.

* * * * *